US012289763B2

(12) United States Patent
Guo et al.

(10) Patent No.: US 12,289,763 B2
(45) Date of Patent: *Apr. 29, 2025

(54) SUSPENDABLE CSMA/CA FOR IEEE 802.15.4 SYSTEM TO REDUCE PACKET DISCARD CAUSED BY BACKOFF FAILURE

(71) Applicants: Mitsubishi Electric Corporation, Tokyo (JP); Mitsubishi Electric Research Laboratories, Inc., Cambridge, MA (US)

(72) Inventors: Jianlin Guo, Newton, MA (US); Yukimasa Nagai, Tokyo (JP); Takenori Sumi, Tokyo (JP); Kieran Parsons, Gloucester, MA (US); Philip Orlik, Cambridge, MA (US)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,291

(22) Filed: Sep. 26, 2023

(65) Prior Publication Data

US 2024/0381424 A1  Nov. 14, 2024

Related U.S. Application Data

(63) Continuation of application No. 17/466,420, filed on Sep. 3, 2021, now Pat. No. 11,985,705.

(Continued)

(51) Int. Cl.
H04W 74/0816 (2024.01)

(52) U.S. Cl.
CPC .............. *H04W 74/0816* (2013.01)

(58) Field of Classification Search
CPC ................................ H04W 74/0816
See application file for complete search history.

(56) References Cited

U.S. PATENT DOCUMENTS 11,166,315 B2   11/2021   Guo et al.
11,622,384 B2    4/2023   Guo et al.
(Continued)

OTHER PUBLICATIONS

Nagai et al. Sub 1 GHz Frequency Band Wireless Coexistence for the Internet of Things, IEEE Access, Digital Object Identifier 10.1109/Access.2021.3107144. Aug. 24, 2021.

*Primary Examiner* — Saad A. Waqas
(74) *Attorney, Agent, or Firm* — Gene Vinokur (57) ABSTRACT

A computer-executed method is provided for IEEE 802.15.4 devices based on a suspendable carrier-sense multiple access with collision avoidance (CSMA/CA) control program and standard CSMA/CA control program for an IEEE 802.15.4 network composing of IEEE 802.15.4 devices. The computer-executed method is provided on an IEEE 802.15.4 device, and causes a processor of the IEEE 802.15.4 device to perform steps that include determining the permission of backoff suspension and the intention of IEEE 802.15.4 device to perform backoff suspension, selecting the suspendable CSMA/CA control program if the backoff suspension is permitted and IEEE 802.15.4 device intends to perform backoff suspension. The suspendable CSMA/CA control program is configured to perform active CCA within each unit backoff period and suspend backoff if channel is detected to be busy, performing a CCA when backoff completes, transmitting frame when the detected channel status is an idle state or incrementing a number of backoff (NB) when the detected channel status is an busy state, determining if a NB exceeds the macMaxCSMABackoffs, incrementing a number of retransmissions (NR) when a NB (Continued)

exceeds the macMaxCSMABackoffs, and discarding frame when a NR exceeds macMaxFrameRetries.

20 Claims, 11 Drawing Sheets

Related U.S. Application Data

(60) Provisional application No. 63/465,936, filed on May 12, 2023, provisional application No. 63/236,305, filed on Aug. 24, 2021.

(56) References Cited

U.S. PATENT DOCUMENTS

| | | | | |
|---|---|---|---|---|
| 2009/0103501 | A1* | 4/2009 | Farrag | H04W 74/02 370/337 |
| 2015/0124722 | A1* | 5/2015 | Seok | H04W 72/0453 370/329 |
| 2017/0245261 | A1* | 8/2017 | Cariou | H04W 72/21 |
| 2022/0046706 | A1* | 2/2022 | Maallem | H04W 36/0007 |

* cited by examiner

| Bits:0-2 | 3 | 4 | 5 | 6 | 7 | 8 | 9 | 10-11 | 12-13 | 14-15 |
|---|---|---|---|---|---|---|---|---|---|---|
| Frame Type | Security Enabled | Frame Pending | AR | PAN ID Compression | Suspendable CSMA/CA | Sequence Number Suppression | IE Present | Destination Addressing Mode | Frame Version | Source Addressing Mode |

FIG. 9B

| Bits:0 | 1 | 2 | 3 | 4 | 5 | 6 | 7 |
|---|---|---|---|---|---|---|---|
| Reserved | Device Type | Power Source | Receiver On When Idle | Association Type | Suspendable CSMA/CA | Security Capability | Allocate Address |

FIG. 9C

| Bits:0 | 1 | 2 | 3 | 4 | 5 | 6 | 7 |
|---|---|---|---|---|---|---|---|
| Reserved | Device Type | Power Source | Receiver On When Idle | Association Type | Suspendable CSMA/CA | Security Capability | Allocate Address |

SUSPENDABLE CSMA/CA FOR IEEE 802.15.4 SYSTEM TO REDUCE PACKET DISCARD CAUSED BY BACKOFF FAILURE

CROSS REFERENCE TO RETALTE APPLICATION

This patent application claims priority benefit under 35 U.S.C. § 119(e) of U.S. Provisional Patent Application Ser. No. 63/465,936, filed on May 12, 2023, the disclosure of which is incorporated by reference herein in its entirety. This application also claims priority benefit under 35 U.S.C. § 120 of U.S. Non-provisional patent application Ser. No. 17/466,420, filed on Sep. 3, 2021, which claims the benefit of U.S. Provisional Patent Application No. 63/236,305, filed on Aug. 24, 2021, the contents of each of which are incorporated herein by reference in their entireties and benefits of each are fully claimed.

FIELD OF THE INVENTION

This invention relates generally to channel access in wireless communication networks, and particularly to channel access of IEEE 802.15.4 systems.

BACKGROUND OF THE INVENTION

With the advent of 5G and beyond communication technologies, the consumer Internet of Things (IoT) devices are becoming more capable to support IoT applications. The size of IoT networks has been rapidly growing from hundreds to thousands. As more and more devices contend for channel access, the efficiency of channel access mechanism becomes critical issue to be addressed.

IEEE 802.15.4 is a commonly referred wireless standard family developed for indoor and outdoor applications. IEEE 802.15.4 standards have been widely implemented in the commercial products such as Bluetooth and smart meter. IEEE 802.15.4 are designed to operate in Sub-1 GHz (SIG) band and 2.4 GHz band, e.g., IEEE 802.15.4g can operate in both Sub-1 GHz band and 2.4 GHz band. An IEEE 802.15.4 network may consist of hundreds to thousands of devices that compete for channel access and cause data loss due to backoff failure. IEEE 802.15.4 uses carrier sense multiple access with collision avoidance (CSMA/CA) mechanism for channel access. For each channel access attempt, IEEE 802.15.4 does not perform clear channel assessment (CCA) during backoff periods and only performs CCA after backoff process completes. This approach works well for light traffic networks, but it does not work well for heavy traffic networks, especially while coexisting with more aggressive interfering networks such as IEEE 802.11 networks. Therefore, new channel access mechanism needs to be provided for IEEE 802.15.4 systems.

Accordingly, it is desirable to provide new channel access methods for IEEE 802.15.4 to achieve better performance.

SUMMARY OF THE INVENTION

Some embodiments are based on the recognition that IEEE 802.15.4 CSMA/CA mechanism is designed for low data rate and low power devices, whose energy saving is critical. Accordingly, IEEE 802.5.4 CSMA/CA mechanism does not support backoff suspension and therefore, does not fit emerging devices without energy constraint well, e.g., electric smart meters.

Figure 4:
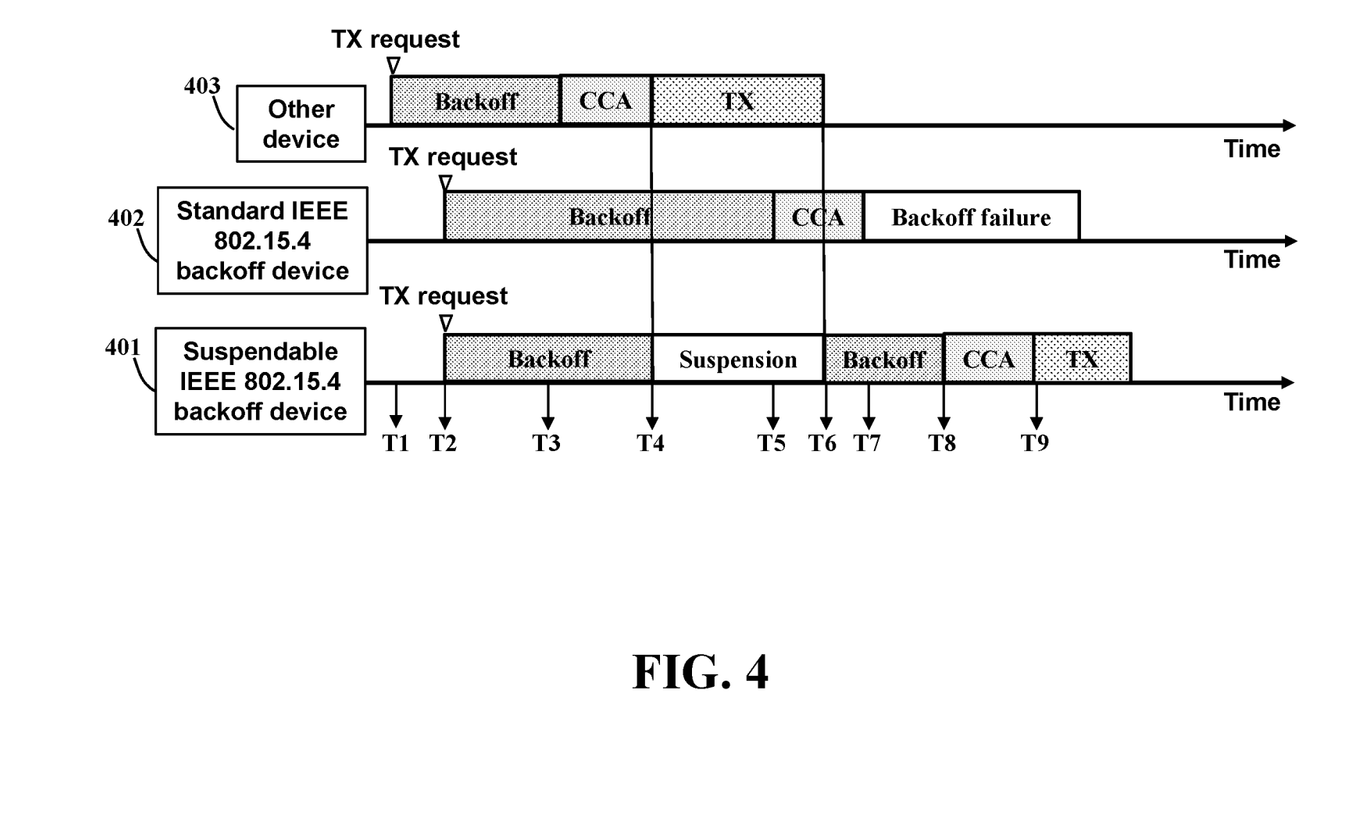
FIG. 4 illustrates that standard IEEE 802.15.4 CSMA/CA algorithm can cause more backoff failure compared with suspendable IEEE 802.15.4 CSMA/CA algorithm, according to embodiments of the present invention.

To that end, it is one object of some embodiments to provide suspendable CSMA/CA mechanism for IEEE 802.15.4 to support backoff suspension, which can reduce probability of packet drop caused by backoff failure as illustrated in FIG. 4.

Accordingly, some embodiments of the invention provide suspendable CSMA/CA mechanism for IEEE 802.15.4 standards, wherein the CCA is performed within each of unit backoff period and the backoff process is suspended once the channel is detected to be busy.

Some embodiments are based on the recognition that energy saving is critical for battery powered devices. However, for the devices such as electric smart meters connected to powerline, the energy is not constrained. These devices can actively perform CCA to increase their channel access opportunities and reduce probability of backoff failure.

Some embodiments are based on the recognition that the maximum number of backoffs (macMaxCSMABackoffs) specified in IEEE 802.15.4 CSMA/CA mechanism is designed to limit the number of backoffs (NB). Once NB exceeds the threshold macMaxCSMABackoffs, the packet is discarded. As more and more devices contend for channel access, the NB can quickly reach the threshold macMaxCSMABackoffs. As a result, the IEEE 802.15.4 packet can be discarded.

To that end, the suspendable CSMA/CA allows backoff suspension, which in turn slows down the increase of NB by suspending backoff process to avoid packet discard when the NB exceeds the macMaxCSMABackoffs. With suspendable CSMA/CA, the CCA after backoff is only performed when channel is idle in last backoff period instead of performing CCA blindly after backoff. The blind CCA increases probability of backoff failure as illustrated in FIG. 4.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

IEEE 802.15.4 standard family is a widely used wireless technologies for various indoor and outdoor applications, e.g., IEEE 802.15.4g is a standard in IEEE 802.15.4 standard family designed for outdoor wireless smart utility networks (Wi-SUN), where electric smart meters do not have energy constraint.

Figure 1:
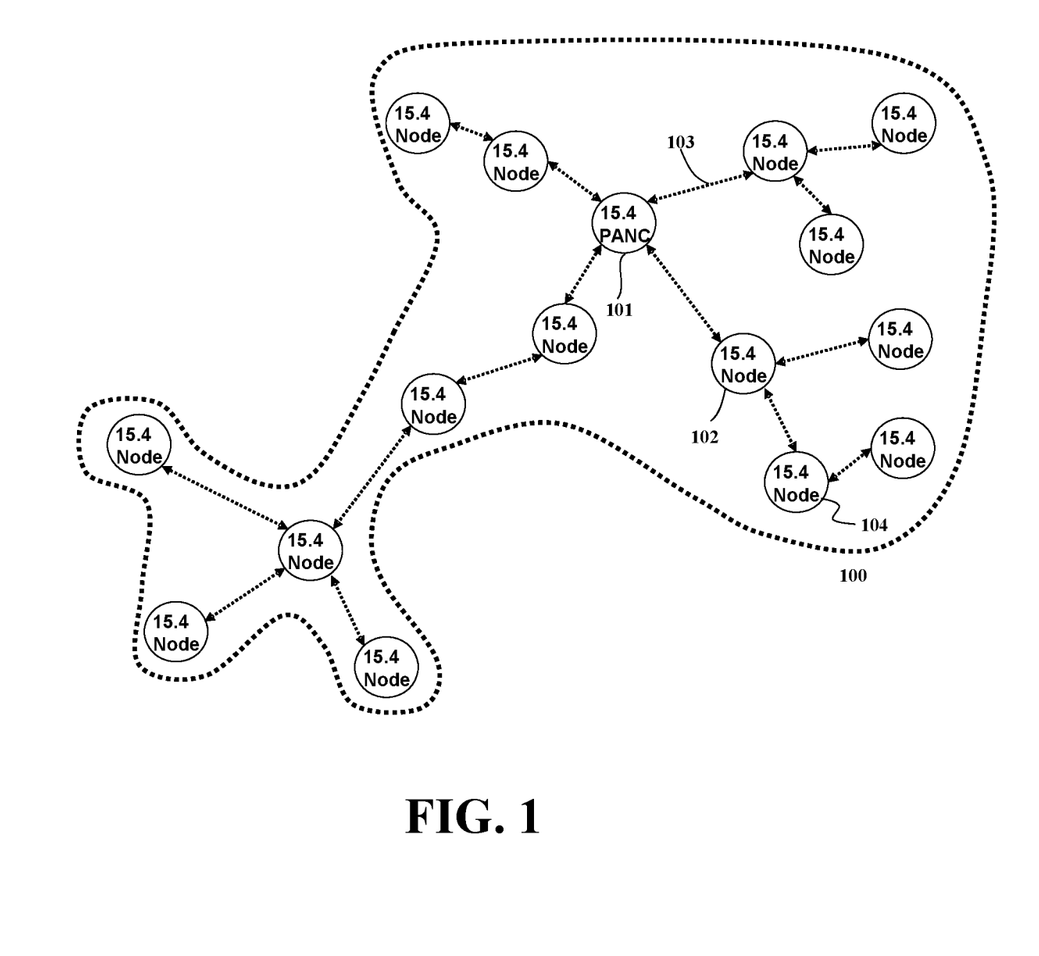
FIG. 1 is a schematic diagram of IEEE 82.15.4 network, according to some embodiments of the present invention.

FIG. 1 shows a schematic of the IEEE 802.15.4 network 100 that contains a Personal Area Network Coordinator (PANC) 101 and the associated nodes. PANC and nodes communicate using IEEE 802.15.4 wireless link 103.

The topology of IEEE 802.15.4 network can be star, mesh or tree, e.g., IEEE 802.15.4 network 100 shown in FIG. 1 is tree topology. In some cases, an IEEE 802.15.4 network 100 can be an IEEE 802.15.4 based smart meter network configured as tree topology. It should be noted that the connections of the tree type configurations can be changed according to the states of communications. In addition, it is not necessary for all nodes to have direct connection with the PANC 101. In other words, an IEEE 802.15.4 node can communicate with the PANC 101 by a multi-hop manner, e.g., IEEE 802.15.4 Node 104 can communicate with the PANC 101 via intermediate IEEE 802.15.4 Node 102.

Figure 2A:
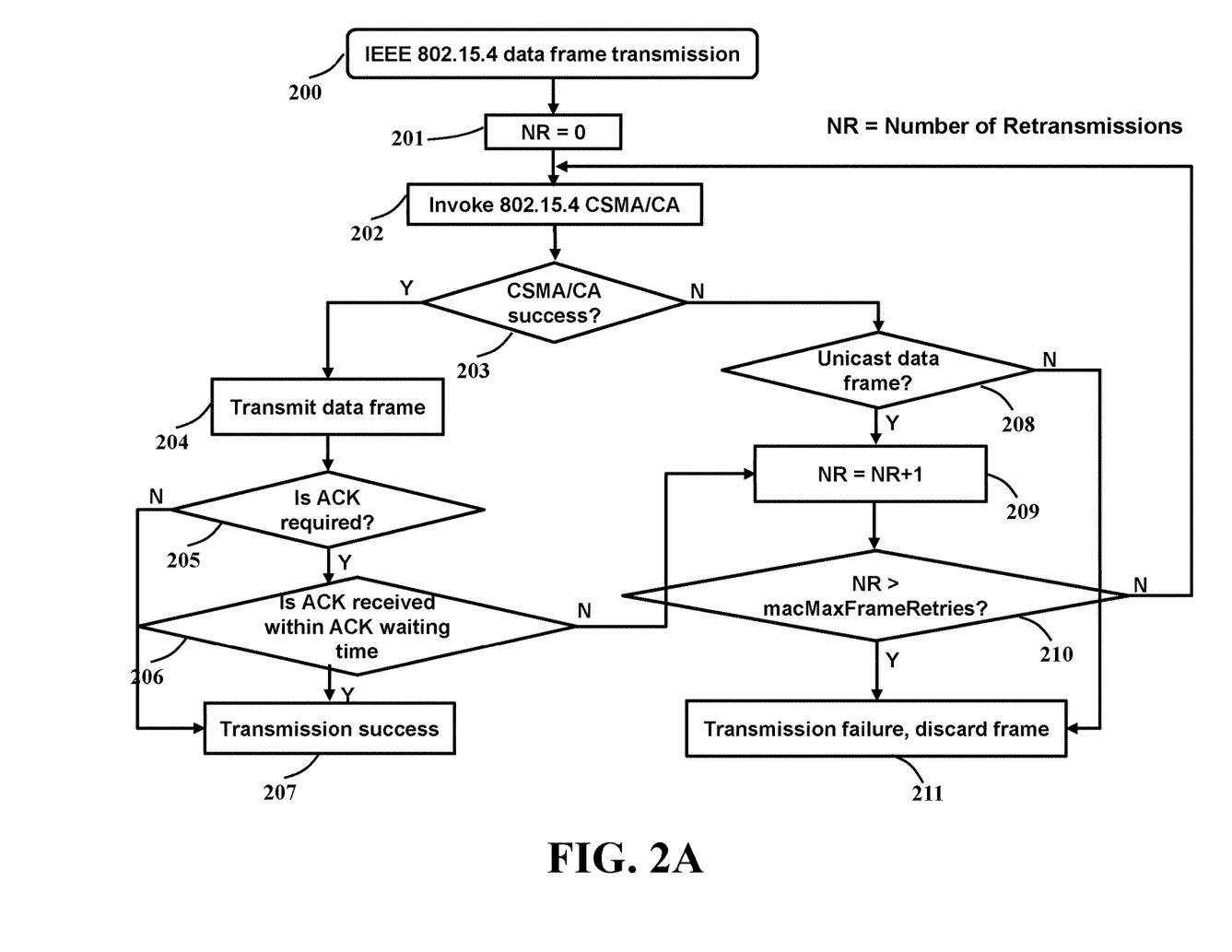
FIG. 2A depicts data transmission flow diagram and transmission status report to the upper layers, according to embodiments of the present invention.
Figure 3:
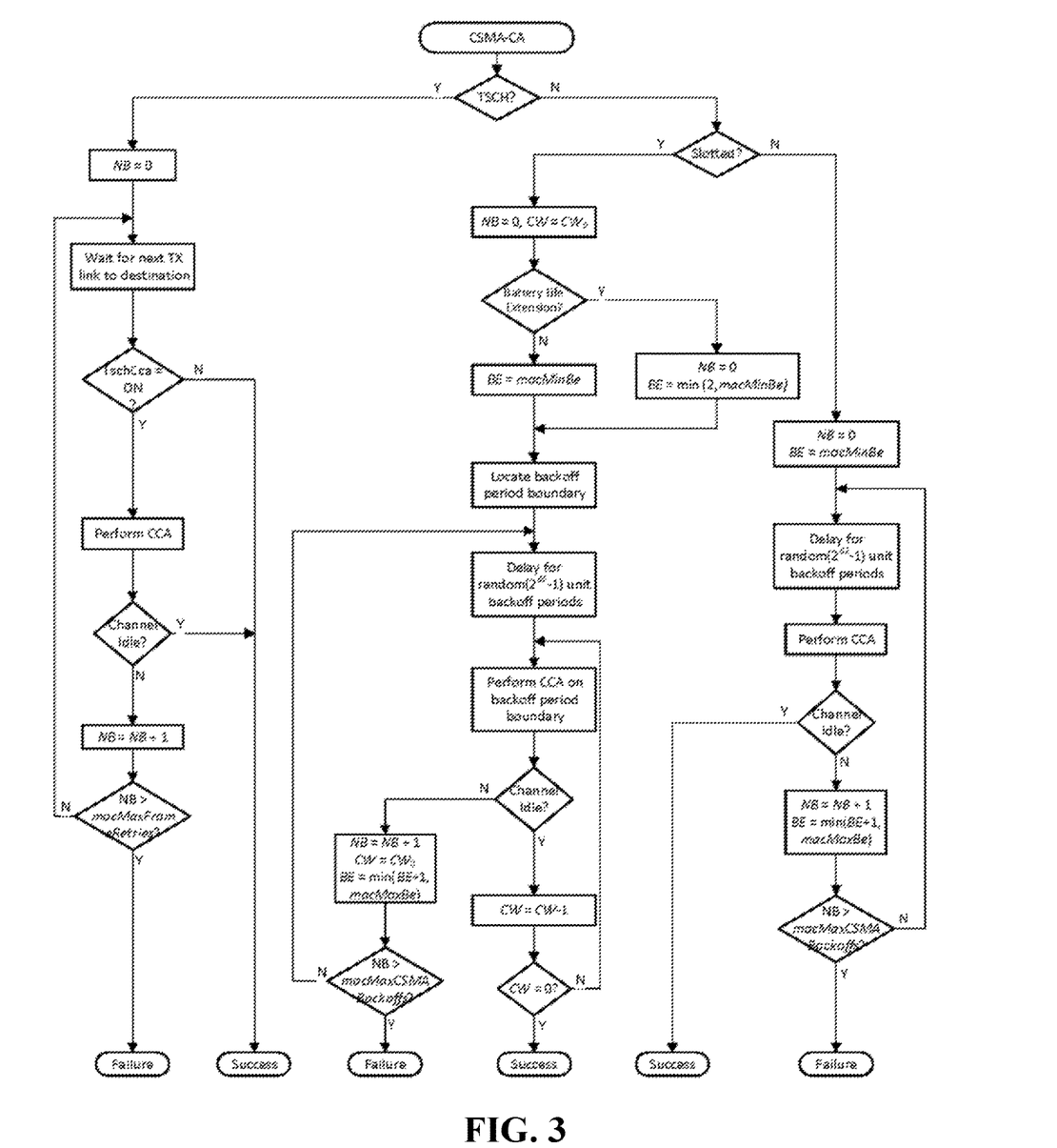
FIG. 3 shows standard carrier sense multiple access with collision avoidance (CSMA/CA) algorithm specified in IEEE 802.15.4-2020, according to embodiments of the present invention.

FIG. 2A shows IEEE 802.15.4 data frame transmission procedure 200. IEEE 802.15.4 MAC sets 201 the number of retransmissions (NR) to 0 and then invokes 202 the CSMA/CA algorithm, where the standard IEEE 802.15.4-2020 CSMA/CA algorithm is depicted in FIG. 3.

If the CSMA/CA algorithm returns success status 203, the channel is detected to be idle and therefore, the frame transmission starts 204. If the ACK is not required (AckTX=0) for the frame 205, IEEE 802.15.4 MAC concludes transmission success 207 and responds to the upper layers using Data Confirm interface with transmission success status. If the ACK is required (AckTX=1) 205 and the ACK is received within the ACK waiting time period 206, IEEE 802.15.4 also concludes transmission success 207 and responds to upper layers using Data Confirm interface with transmission success status. If the ACK is required and the ACK is not received within the ACK waiting time period 206, IEEE 802.15.4 MAC increments 209 NR by 1 and checks if the NR exceeds the threshold macMaxFrameRetries 210. If yes, IEEE 802.15.4 MAC concludes the frame transmission failure and discards the frame 211. IEEE 802.15.4 MAC then responds to upper layers using Data Confirm interface with NO_ACK status. If the NR is smaller than or equal to the threshold macMaxFrameRetries 210, IEEE 802.15.4 MAC goes for another transmission attempt.

If the CSMA/CA algorithm returns failure status 203, IEEE 802.15.4 MAC checks if the frame is unicast frame 208. If no, IEEE 802.15.4 MAC concludes the transmission failure and discards the frame 211. IEEE 802.15.4 MAC then responds to upper layers using Data Confirm interface with CHANNEK_ACCESS_FAILURE status. If the frame is unicast frame 208, IEEE 802.15.4 MAC increments 209 NR by 1 and then checks if the NR exceeds the threshold macMaxFrameRetries 210. If yes, IEEE 802.15.4 MAC concludes the transmission failure and discards the frame 211. IEEE 802.15.4 MAC then responds to upper layers using Data Confirm interface with CHANNEK_ACCESS_FAILURE status. If the NR is smaller than or equal to the threshold macMaxFrameRetries, IEEE 802.15.4 MAC goes for another transmission attempt.

Figure 2B:
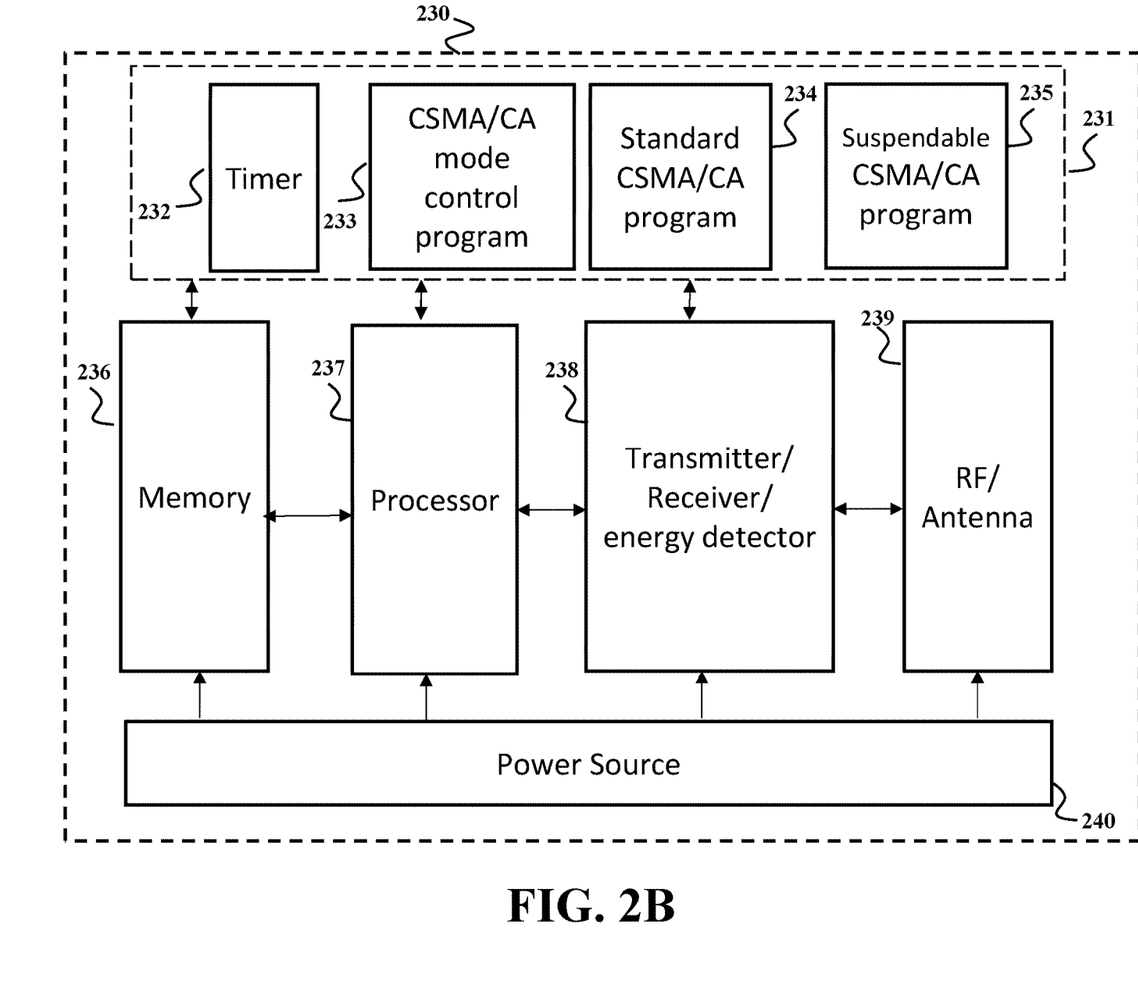
FIG. 2B is a schematic of a structure of an IEEE 802.15.4 CSMA/CA device participating in forming the networks of FIG. 1, according to embodiments of the present invention.

FIG. 2B shows an example of a structure of an IEEE 802.15.4 device participating in forming the networks of FIG. 1, in which an IEEE 802.15.4 device 230 may include a memory 236, a processor 237, a power source 240, a transceiver 238 including transmitter, receiver and energy detector and a RF antenna 239. Further, control programs are included in a storage 231 in connection with the memory 236, the processor 237 and the transceiver 238. The control programs 231 include a CSMA/CA mode control program 233, a standard CSMA/CA program 234, a suspendable CSMA/CA program 235, and a timer 232 that is used by the transceiver 238 to perform the CSMA/CA mode control program 233. Depending on the permission of the backoff suspension and intention of IEEE 802.15.4 device 230 on backoff suspension, the CSMA/CA mode control program 233 can either call standard IEEE 802.15.4 CSMA/CA program 234 or suspendable CSMA/CA program 235.

FIG. 3 shows standard CSMA/CA algorithm in the IEEE 802.15.4-2020. The embodiments of the present invention provide suspendable CSMA/CA for the non-slotted IEEE 802.15.4 network. Therefore, only non-slotted branch in FIG. 3 is described below. For the non-slotted IEEE 802.15.4 network, i.e., the beacon unenabled network, the standard IEEE 802.15.4 CSMA/CA algorithm initials the number of backoff (NB) to 0 and backoff exponent (BE) to the macMinBE. The CSMA/CA algorithm then delays random number of unit backoff periods with the random number drawn uniformly within interval $[0, 2^{BE}-1]$, which is called backoff window or delay window, where BE starts with macMinBE and increases until to the macMaxBE. When the random backoff/delay completes, the CSMA/CA algorithm performs CCA operation. If the channel is detected to be idle, the CSMA/CA algorithm reports success and the frame transmission starts. If the channel is detected to be busy, the CSMA/CA algorithm updates NB and BE as NB=NB+1 and BE=min{BE+1, macMaxBE}. If the NB exceeds the threshold macMaxCSMABackoffs, the CSMA/CA algorithm terminates with failure status. Otherwise, CSMA/CA algorithm continues (goes to the random backoff/delay).

For the non-slotted network, the standard IEEE 802.15.4 CSMA/CA algorithm performs the random delay first no matter how long channel has been idle. Using this "Backoff+CCA" based CSMA/CA mechanism, the CCA is performed blindly and therefore, it decreases channel access probability as illustrated in FIG. 4.

IEEE 802.15.4 CSMA/CA Failure Packet Discard

In IEEE 802.15.4, data frame transmission failure is incurred by a) CSMA/CA failure or b) transmission failure. The CSMA/CA failure occurs when CSMA/CA algorithm terminates with a failure status because the NB exceeds the threshold macMaxCSMABackoffs as shown in FIG. 2A. Transmission failure occurs because of unsuccessful frame transmission or unsuccessful acknowledgement transmission or later acknowledgement receiving. For each CSMA/CA failure or transmission failure, the number of retransmissions (NR) is incremented by 1. An IEEE 802.15.4 frame is discarded with CHANNEL_ACCESS_FAILURE status when the NR exceeds the threshold macMaxFrameRetries due to CSMA/CA failure. An IEEE 802.15.4 frame is discarded with NO_ACK status when the NR exceeds the threshold macMaxFrameRetries due to transmission failure. Other transmissions can cause CSMA/CA backoff failure as shown in FIGS. 4, which can in turn cause packet discard of IEEE 802.15.4 devices.

FIG. 4 shows an example of standard IEEE 802.15.4 CSMA/CA backoff failure caused by other transmission. However, the suspendable CSMA/CA program 235 avoids the backoff failure by suspending the backoff process. In FIG. 4, both suspendable IEEE 802.15.4 backoff device 401 and standard IEEE 802.15.4 backoff device 402 receive data transmission request at time T2 and therefore, start backoff at time T2. They also draw the same number of the unit backoff periods and therefore, need to backoff for the same amount of time. However, at earlier time T1, other device 403 receives data transmission request and starts backoff. At time T3, other device 403 finishes backoff and starts CCA operation. At time T4, other device 403 completes CCA and detects idle channel, and therefore, starts data transmission. Suspendable IEEE 802.15.4 backoff device 401 performs active CCA within each of unit backoff periods and detects transmission of other device 403, and therefore, suspends its backoff process. On the other hand, standard IEEE 802.15.4 backoff device 402 does not suspend its backoff and completes backoff at time T5, and therefore, performs CCA at time T5. However, at time T5, other device 403 is still transmitting. As a result, standard IEEE 802.15.4 backoff device 402 detects busy channel and returns backoff failure at time T7. Meanwhile, suspendable IEEE 802.15.4 backoff device 401 detects the end of other device transmission at time T6 and resumes remaining backoff. At time T8, the suspendable IEEE 802.15.4 backoff device 401 completes backoff and starts CCA, which ends at time T9 and reports idle channel. Accordingly, the suspendable IEEE 802.15.4 backoff device 401 successfully transmits its data at time T9 without backoff failure.

FIG. 4 clearly shows that the standard IEEE 802.15.4 CSMA/CA mechanism can cause more packet discard compared with suspendable IEEE 802.15.4 CSMA/CA mechanism.

Suspendable CSMA/CA for IEEE 802.15.4

Some embodiments of the invention provide the suspendable CSMA/CA for IEEE 802.15.4 to address CSMA/CA failure packet discard caused by other transmissions.

To allow suspendable CSMA/CA, a Suspendable CSMA/CA field is defined. The Suspendable CSMA/CA field=1 indicating backoff suspension is allowed. In this case, IEEE 802.15.4 devices may suspend backoff in CSMA/CA algorithm. If IEEE 802.15.4 devices intend to perform backoff suspension, they invoke Suspendable CSMA-CA algorithm 504. The Suspendable CSMA/CA field=0 indicating backoff suspension is not permitted. In this case, IEEE 802.15.4 devices cannot perform backoff suspension in CSMA/CA algorithm.

The backoff suspension permission can be determined by region regulator or network manager or application developer or combination of them, e.g., in the United States, more spectrum is allocated to IEEE 802.15.4 communications and therefore, backoff suspension is not needed, and in Japan, less spectrum is allocated to IEEE 802.15.4 communications and therefore, backoff suspension is needed.

Even if the Suspendable CSMA/CA field=1, IEEE 802.15.4 devices may choose not to perform backoff suspension, e.g., if there is no traffic congestion or device energy supply is constrained.

Figure 5A:
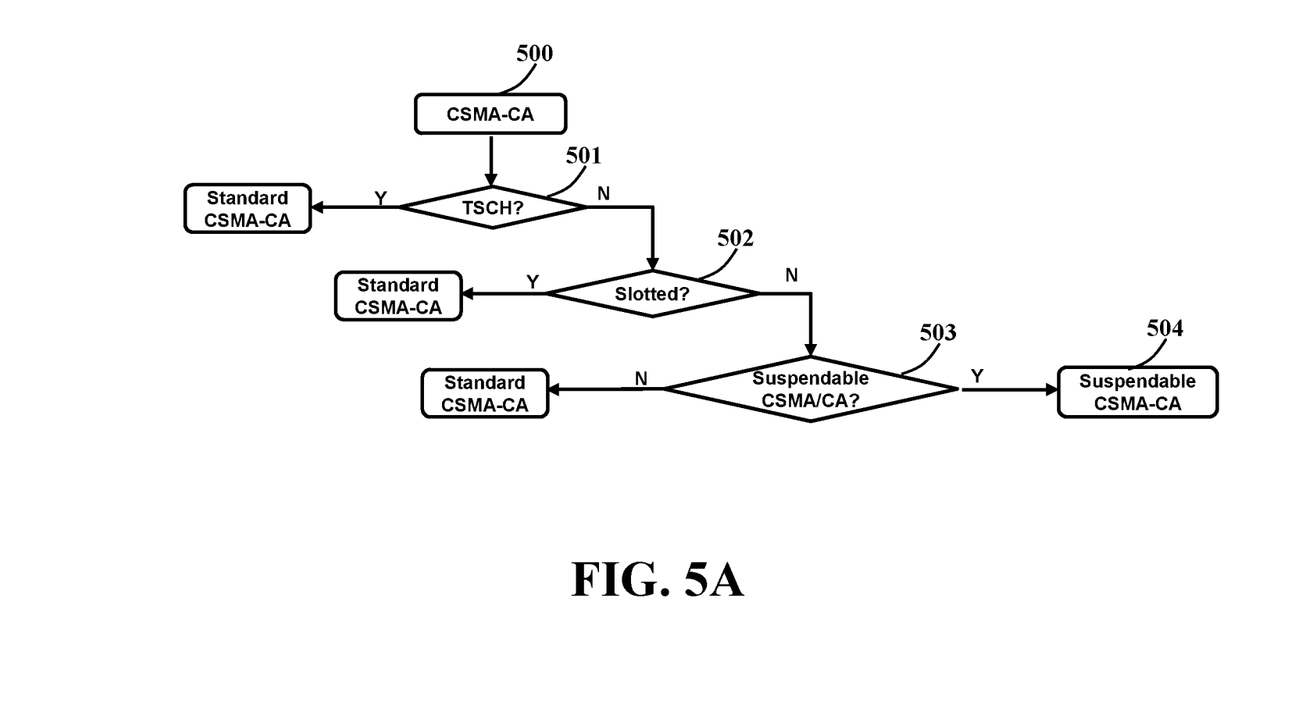
FIG. 5A shows flow chart of the enhanced carrier sense multiple access with collision avoidance (CSMA/CA) mechanism for IEEE 802.15.4, according to embodiments of the present invention.
Figure 5B:
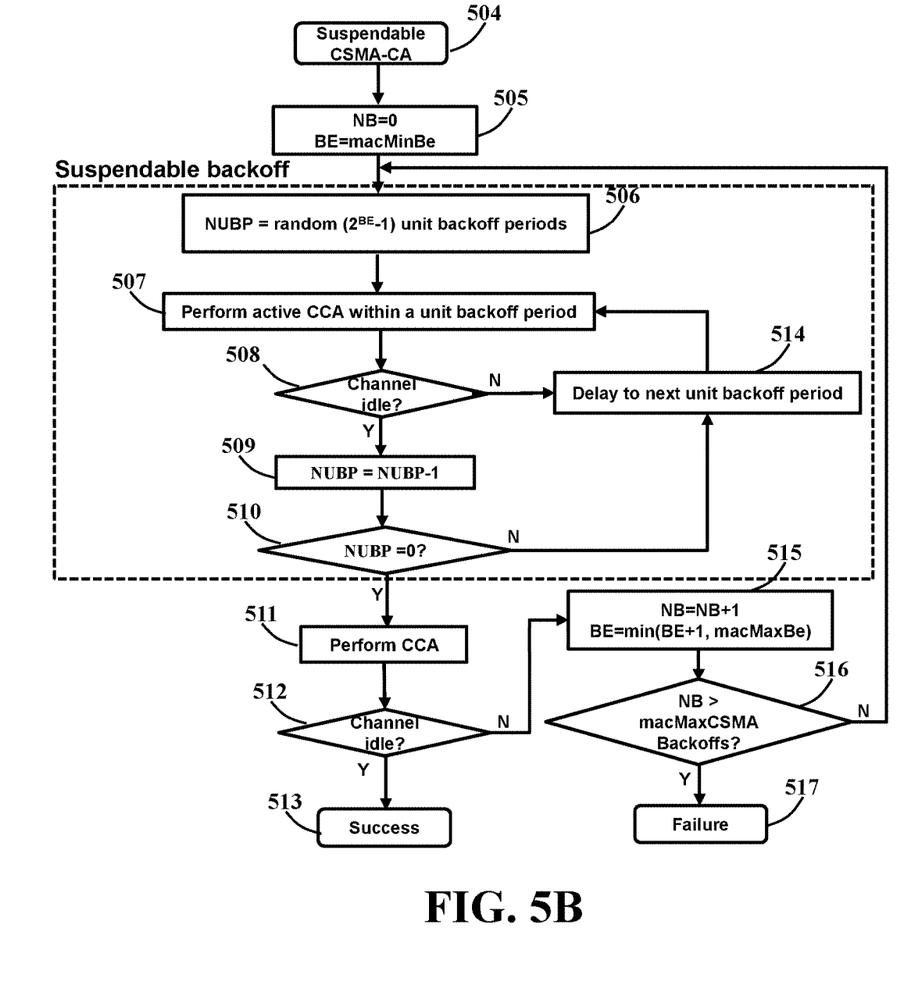
FIG. 5B shows flow chart of the suspendable carrier sense multiple access with collision avoidance (CSMA/CA) method for IEEE 802.15.4, according to embodiments of the present invention.

FIG. 5A shows the flow chart of the invented CSMA/CA 500 for IEEE 802.15.4 with backoff suspension support. The invented CSMA/CA allows IEEE 802.15.4 devices to perform backoff suspension to avoid channel access failure packet discard.

The invented CSMA/CA 500 checks if IEEE 802.15.4 network is TSCH network 501 and slotted network 502. For the non-slotted network, the invented CSMA/CA checks 503 if backoff suspension is allowed, i.e., Suspendable CSMA/CA field=1 or 0. If Suspendable CSMA/CA field=1 and device intends to perform backoff suspension, the invented CSMA/CA goes to Suspendable CSMA/CA algorithm 504.

FIG. 5B shows the Suspendable CSMA/CA 504. The Suspendable CSMA/CA algorithm sets 505 NB=0 and BE=macMinBE. It then uniformly draws 506 a random number of unit backoff periods within $[0, 2^{BE}-1]$ and sets number of unit backoff periods (NUBP) to the random number drawn. The Suspendable SMA/CA algorithm then performs 507 active CCA within each unit backoff period as shown in FIG. 5B. If channel is busy 508, the Suspendable CSMA/CA algorithm waits 514 until to next unit backoff period and performs 507 active CCA again. In this case, NUBP is not decreased, in other words, backoff is suspended because all backoff parameters including NB are not updated. If channel is idle 508, the Suspendable CSMA/CA algorithm decreases 509 NUBP by 1. If the NUBP 510 is not 0, then backoff has not completed. Therefore, the Suspendable CSMA/CA algorithm waits 514 until to next unit backoff period and performs 507 active CCA again. Otherwise, if NUBP 510 is 0, then backoff has been completed. Then Suspendable CSMA/CA algorithm performs 511 standard CCA. If channel is idle 512, backoff successes 513. Otherwise, if channel is busy 512, Suspendable CSMA/CA algorithm increases 515 NB by 1. If NB exceeds 516 the predefined threshold macMaxCSMABackoffs, backoff fails 517. Otherwise, Suspendable CSMA/CA algorithm performs another round of backoff.

Key differences between standard CSMA/CA algorithm and Suspendable CSMA/CA algorithm:

Suspendable CSMA/CA algorithm performs CCA in each unit backoff period, standard CSMA/CA algorithm does not perform CCA during entire backoff process.

Suspendable CSMA/CA algorithm performs CCA 511 only if channel in the last unit backoff period is detected to be idle. On the other hand, standard CSMA/CA algorithm performs CCA 511 no matter channel in the last unit backoff period is busy or idle.

Suspendable CSMA/CA algorithm increases NB only if other transmission starts within CCA period where CCA 511 is being performed. On the other hand, standard CSMA/CA algorithm increases NB no matter other transmission starts before CCA period or within CCA period where CCA 511 is being performed. Accordingly, standard CSMA/CA algorithm has greater probability to increase NB, which in turn causes more chance of backoff failure.

By performing active CCA, suspendable CSMA/CA algorithm has capability to avoid packet discard caused by interference from non-IEEE 802.15.4 devices such as IEEE 802.11 devices.

In summary, suspendable CSMA/CA algorithm can reduce chance of backoff failure.

Figure 6:
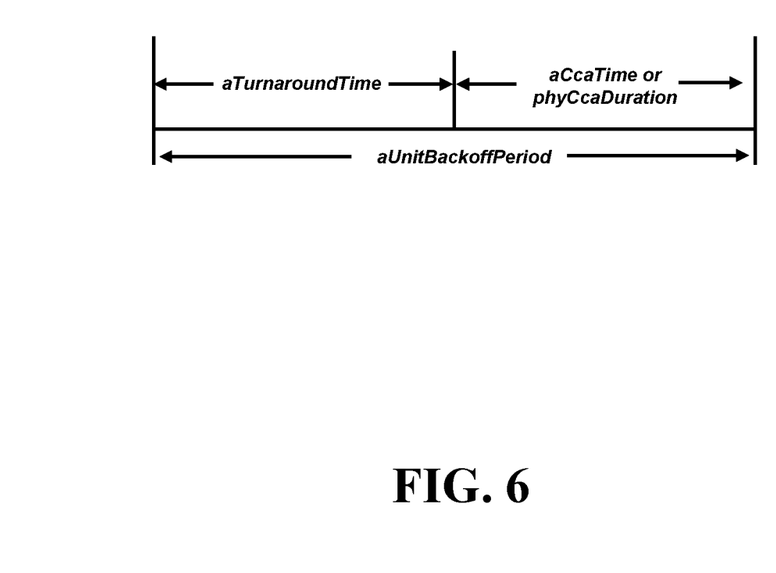
FIG. 6 shows the structure of the unit backoff period specified in IEEE 802.15.4, according to embodiments of the present invention.
Figure 7A:
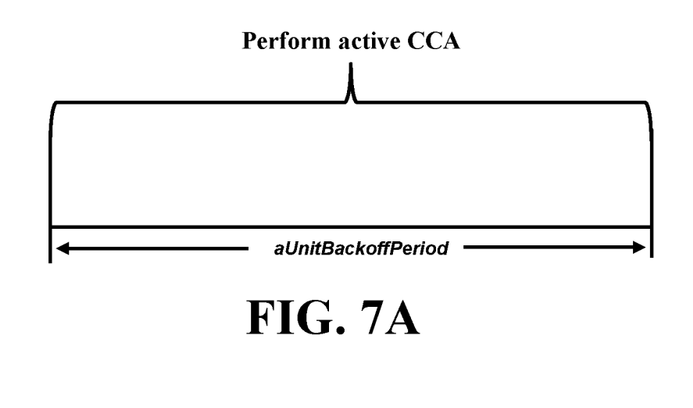
FIG. 7A shows an example of performing active CCA during entire unit backoff period, according to embodiments of the present invention.
Figure 7B:
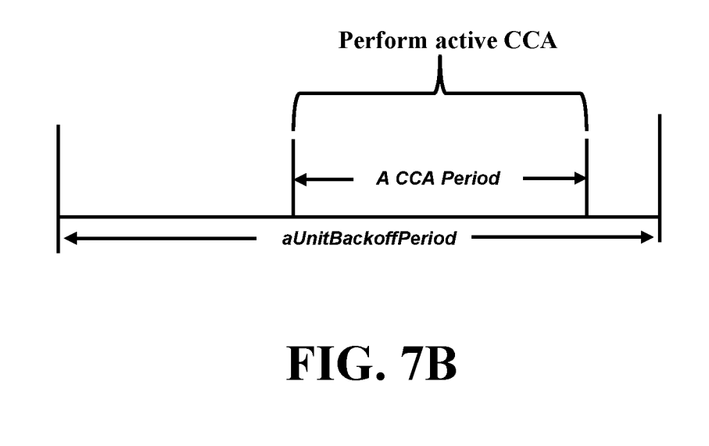
FIG. 7B shows an example of performing active CCA during a portion of unit backoff period, according to embodiments of the present invention.

In IEEE 802.15.4 standard, a unit backoff period is longer than a CCA period. FIG. 6 shows the structure of the unit backoff period, which includes aTurnaroundTime plus a CCA period. The CCA period equals to aCcaTime for all PHYs except SUN PHYs operating in the 920 MHz band and equals to phyCcaDuration for SUN PHYs operating in the 920 MHz band. This indicates that to perform 507 active CCA within a unit backoff period, CSMA/CA algorithm has multiple choices. It can perform CCA during entire unit backoff period or during a portion of unit backoff period. FIG. 7A shows an example, in which CSMA/CA algorithm performs active CCA during entire unit backoff period. FIG. 7B shows an example, in which CSMA/CA algorithm performs active CCA within a CCA period, i.e., a portion of unit backoff period.

Figure 8:
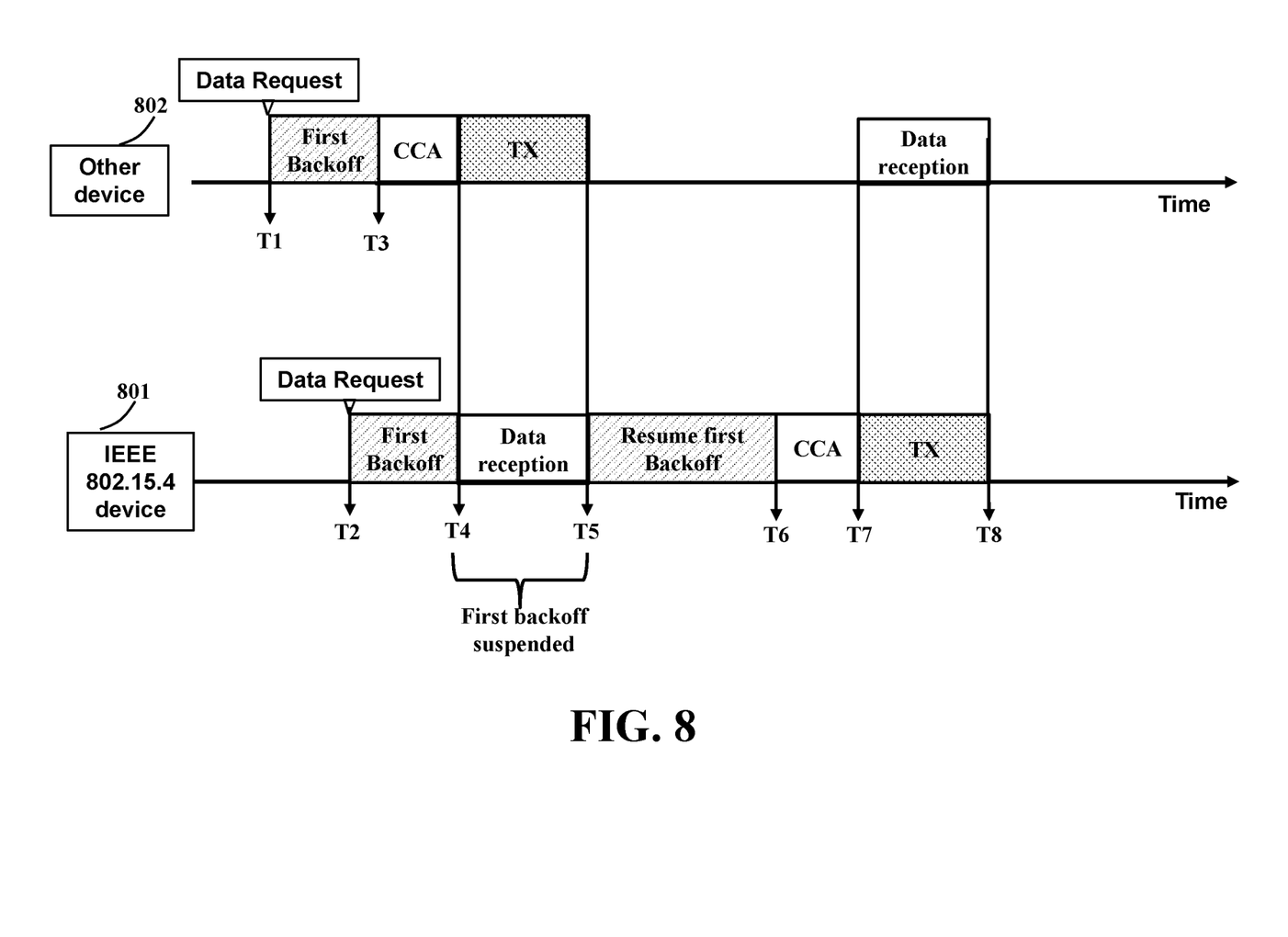
FIG. 8 illustrates an example of backoff suspension execution provided in suspendable CSMA/CA mechanism, according to embodiments of the present invention.

FIG. 8 shows an example of suspendable CSMA/CA algorithm execution, in which there is an IEEE 802.15.4 device 801 and other device 802, where other device 802 can be an IEEE 802.15.4 device or non-IEEE 802.15.4 device such as IEEE 802.11 device. At time T1, other device receives a data request and therefore, device 802 starts first backoff. At time T2, IEEE 802.15.4 device 801 receives a data request and therefore, it also starts first backoff. At time T3, other device 802 completes first backoff and starts CCA operation. At time T4, other device 802 finishes CCA and detects channel to be idle. Therefore, Other device 802 starts transmission. At same time T4, IEEE 802.15.4 device 801 detects transmission by other device 802 and therefore, suspends its first backoff and performs data reception if other device 802 is an IEEE 802.15.4 device. At time T5, other device 802 finishes transmission and channel becomes idle. Therefore, IEEE 802.15.4 device 801 resumes its first backoff. At time T6, IEEE 802.15.4 device completes its first backoff and starts CCA operation. At time T7, IEEE 802.15.4 device 801 finishes CCA and channel is idle. Therefore, it starts data transmission. At same time, other device 802 starts data reception if other device 802 is an IEEE 802.15.4 device. Finally, at time T8, IEEE 802.15.4 device 801 finishes data transmission.

It should be noticed that is other device 802 is a non-IEEE 802.15.4 device, devices 801 and 802 cannot receive data from each other. However, they can interfere with each other. By performing Suspendable CSMA/CA algorithm, IEEE 802.15.4 device 801 can avoid packet discard caused by interference.

Figure 9A:
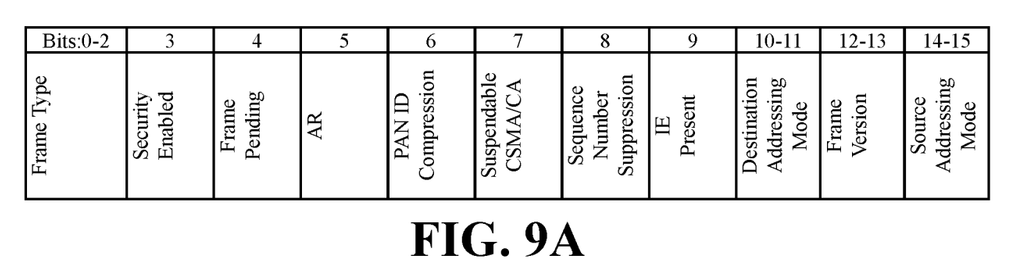
FIG. 9A shows the invented Format of the Frame Control field to indicate whether backoff suspension is allowed or not.
Figure 9B:
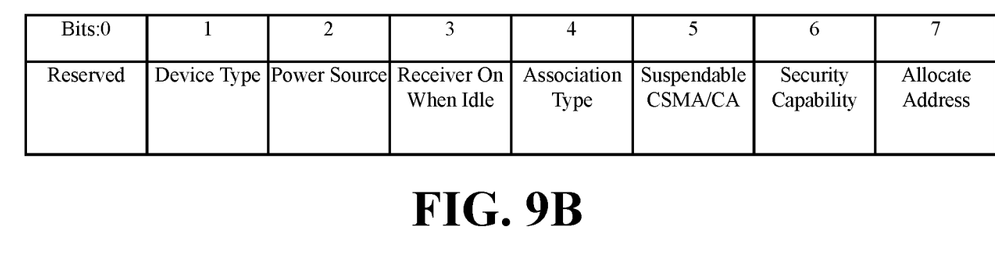
FIG. 9B shows the invented Capability Information field of the Association Request Command, according to embodiments of the present invention.
Figure 9C:
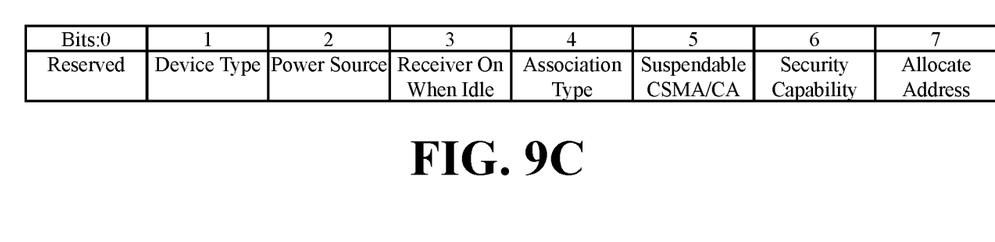
FIG. 9C shows the invented Capability Information field of the DSME Association Request Command, according to embodiments of the present invention.

In an IEEE 802.15.4 network, the Personal Area Network Coordinator (PANC), i.e., network manager, and devices can realize the Suspendable CSMA-CA algorithm 504 via invented Frame Control field of the Association Response Command shown in FIG. 9A and Capability Information field of the Association Request Command shown in FIG. 9B and FIG. 9C, where FIG. 9B depicts the Capability Information field of the Association Request Command and FIG. 9C shows Capability Information field of the DSME Association Request Command with DSME standing for Deterministic and Synchronous Multichannel Extension. More specifically, devices set Suspendable CSMA/CA bit (bit 5) to 1 in the Capability Information field of the Association Request Command or the DSME Association Request Command to indicate their intentions to perform backoff Suspension. In response, the PANC sets Suspendable CSMA/CA bit (bit 7) to 1 in the Frame Control field of the Association Response Command to indicate backoff suspension is permitted or sets Suspendable CSMA/CA bit (bit 7) to 0 in the Frame Control field of the Association Response Command to indicate backoff suspension is not permitted. The PANC can determine backoff suspension permission based on region regulator or application requirement or network performance or number of devices intend to perform backoff suspension or combination thereof.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A computer-executed method for performing a suspendable carrier-sense multiple access with collision avoidance (CSMA/CA) control program in an IEEE 802.15.4 network composing of IEEE 802.15.4 devices, wherein the computer-executed method causes a processor of the IEEE 802.15.4 device to perform steps that comprise:

determining permission of backoff suspension by receiving an Association Response Command from a network manager of the IEEE 802.15.4 network;

obtaining intention of the IEEE 802.15.4 device to perform backoff suspension contained in a suspendable CSMA/CA field of an Association Request Command;

invoking a suspendable CSMA/CA control program from the memory if the backoff suspension is permitted and the IEEE 802.15.4 device intends to perform the backoff suspension, wherein the suspendable CSMA/CA control program performs steps of:

performing active CCA within each of unit backoff periods;

suspending a backoff process when a channel of the IEEE 802.15.4 network is detected to be busy; and resuming the backoff process once a state of the channel is detected to be idle; and transmitting data frame when the detected status is the idle or incrementing a number of backoffs (NB) when the detected channel status is a busy state;

determining if the NB exceeds a macMaxCSMABackoffs;

incrementing a number of retransmissions (NR) when the NB exceeds the macMaxCSMABackoffs, and discarding the data frame when the NR exceeds a macMaxFrameRetries.

2. The method of claim 1, wherein the IEEE 802.15.4 device applies a standard CSMA/CA channel access mechanism if the backoff suspension is not permitted, wherein the IEEE 802.15.4 device applies a suspendable CSMA/CA channel access mechanism if the backoff suspension is permitted.

3. The method of claim 1, wherein the backoff suspension permission is determined by the network manager PANC based on a region regulator or an application requirement or a network performance or a number of IEEE 802.15.4 devices intend to perform backoff suspension or combination thereof.

4. The method of claim 3, wherein the network manager provides the backoff suspension permission to IEEE 802.15.4 devices during network construction process or IEEE 802.15.4 devices dynamically request backoff permission from the network manager.

5. The method of claim 4, wherein the IEEE 802.15.4 devices choose not to perform the backoff suspension even if the backoff suspension is permitted.

6. The method of claim 1, wherein the IEEE 802.15.4 device that executes the backoff suspension to perform the active CCA within each of the unit backoff periods and suspends backoff if channel is detected to be busy.

7. The method of claim 6, wherein the IEEE 802.15.4 device that performs suspendable CSMA/CA first draws a random number of unit backoff periods (NUBP) within [0, $2^{BE}-1$], then performs the active CCA within each of the unit backoff periods, wherein backoff is suspended (i.e., NUBP is not decreased) if channel is busy, wherein the backoff process continues if channel is idle, wherein the backoff process is completed once NUBP reaches to zero.

8. The method of claim 6, wherein the IEEE 802.15.4 device performs standard CCA within a CCA period once number of unit backoff periods (NUBP) reaches to zero.

9. The method of claim 8, wherein the IEEE 802.15.4 device transmits data if CCA reports idle channel, wherein the CSMA/CA algorithm reports backoff failure if the CCA reports busy channel and number of backoffs (NB) is increased by 1.

10. The method of claim 9, wherein the CSMA/CA algorithm reports channel access failure if number of backoffs (NB) exceeds the pre-defined macMaxCSMABackoffs, wherein the number of retransmissions (NR) is incremented by 1 if the CSMA/CA algorithm reports channel access failure.

11. The method of claim 10, wherein the IEEE 802.15.4 MAC discards data if number of retransmissions (NR) exceeds macMaxFrameRetries.

12. The method of claim 6, wherein the IEEE 802.15.4 device can perform active CCA during entire unit backoff period or during portion of unit backoff period.

13. A network device for performing suspendable carrier-sense multiple access with collision avoidance (CSMA/CA) in an IEEE 802.15.4 network, comprising:

a processor; and a memory configured to store a CSMA/CA mode control program that causes the processor to perform steps of:

determining permission of backoff suspension by receiving an Association Response Command from a network manager of the IEEE 802.15.4 network;

obtaining intention of the IEEE 802.15.4 device to perform backoff suspension contained in a suspendable CSMA/CA field of an Association Request Command;

invoking a suspendable CSMA/CA control program from the memory if the backoff suspension is permitted and the IEEE 802.15.4 device intends to perform the backoff suspension, wherein the suspendable CSMA/CA control program is configured to perform:

performing active CCA within each of unit backoff periods;

suspending a backoff process when a channel of the IEEE 802.15.4 network is detected to be busy; and resuming the backoff process once a state of the channel is detected to be idle; and transmitting data frame when the detected status is the idle or incrementing a number of backoffs (NB) when the detected channel status is a busy state;

determining if the NB exceeds a macMaxCSMABackoffs;

incrementing a number of retransmissions (NR) when the NB exceeds the macMaxCSMABackoffs, and discarding the data frame when the NR exceeds a macMaxFrameRetries.

14. The network device of claim 13, wherein the network device applies a standard CSMA/CA channel access mechanism if the backoff suspension is not permitted, wherein the network device applies a suspendable CSMA/CA channel access mechanism if the backoff suspension is permitted.

15. The network device of claim 13, wherein the backoff suspension permission is determined by the network manager or a region regulator or an application developer or combination thereof.

16. The network device of claim 15, wherein the network manager provides the backoff suspension permission to network devices during network construction process or network devices in the IEEE 802.15.4 network dynamically request backoff permission from the network manager.

17. The network device of claim 16, wherein other network devices choose not to perform the backoff suspension even if the backoff suspension is permitted.

18. The network device of claim 13, wherein the network device executes the backoff suspension to perform the active CCA within each of the unit backoff periods and suspends the backoff process if channel is detected to be busy.

19. The network device of claim 18, wherein the network device performs a suspendable CSMA/CA first and draws a random number of unit backoff periods (NUBP) within [0, $2^{BE}-1$], then performs the active CCA within each of the unit backoff periods, wherein backoff is suspended (i.e., NUBP is not decreased) if channel is busy, wherein the backoff process continues if channel is idle, wherein the backoff process is completed once NUBP reaches to zero.

20. The network device of claim 18, wherein the IEEE 802.15.4 device performs standard CCA within a CCA period once number of unit backoff periods (NUBP) reaches to zero.

\* \* \* \* \*